United States Patent [19]

Johnson

[11] Patent Number: 5,023,502

[45] Date of Patent: Jun. 11, 1991

[54] SWITCHED RELUCTANCE MOTOR ROTOR

[75] Inventor: J. Herbert Johnson, Tipp City, Ohio

[73] Assignee: A. O. Smith Corporation, Milwaukee, Wis.

[21] Appl. No.: 429,823

[22] Filed: Oct. 31, 1989

[51] Int. Cl.⁵ .......................................... H02K 1/22
[52] U.S. Cl. ................................... 310/261; 310/42; 310/43; 310/217; 310/218; 310/269
[58] Field of Search ................... 310/217, 218, 42, 43, 310/45, 91, 163, 168, 261, 262, 267, 269, 216; 318/701; 29/598

[56] References Cited

U.S. PATENT DOCUMENTS

| | | | |
|---|---|---|---|
| 3,157,806 | 11/1964 | Wiedemann | 310/269 |
| 3,588,557 | 6/1971 | Kilgore | 310/269 |
| 3,611,556 | 10/1971 | Matsubara et al. | 29/598 |
| 3,882,336 | 5/1975 | Boyd | 310/264 |
| 4,260,921 | 4/1981 | Silver | 310/218 |
| 4,504,755 | 3/1985 | Semones | 310/261 |
| 4,525,925 | 7/1985 | Jones | 310/217 |
| 4,670,696 | 6/1987 | Byrne et al. | 318/701 |
| 4,674,178 | 6/1987 | Patel | 310/43 |
| 4,795,933 | 1/1989 | Sakai | 310/269 |
| 4,864,174 | 9/1989 | Kawamura | 310/261 |

FOREIGN PATENT DOCUMENTS

| | | | |
|---|---|---|---|
| 2605815 | 8/1977 | Fed. Rep. of Germany | 310/269 |
| 1210349 | 3/1960 | France | 310/43 |
| 0030702 | 3/1978 | Japan | 310/269 |
| 0037883 | 3/1980 | Japan | 310/269 |
| 0484604 | 12/1975 | U.S.S.R. | 310/269 |
| 008802 | 4/1905 | United Kingdom | 310/269 |

OTHER PUBLICATIONS

"Brushless Permanent-Magnet and Reluctance Motor Drives", T. J. E. Miller, Clarendon Press, Oxford, 1989, pp. 150-189.

Primary Examiner—R. Skudy
Attorney, Agent, or Firm—Andrus, Sceales, Starke, Sawall

[57] ABSTRACT

Retention tang structure (61-64) is provided on the hub (52) of a switched reluctance motor rotor (50) for retaining electrically insulating material (65-68) in gaps (57-60) between the rotor poles (53-56), and minimizing magnetic flux path lines through the tangs. A one-piece unitary harness (92) is also provided and is molded in-situ axially around the laminated rotor stack and further structurally enhances the hold-together strength thereof. The electrically insulating molded material is integrally formed both in the gaps (57-60) between the rotor poles (53-56) and on the axial ends (88, 90) of the laminated stack to provide in combination axial runners (65-68) of molded material extending axially along the gaps (57-60) and integral with annular end rings (94, 96) of molded material on the axial ends (88, 90), which combination structurally enhances the hold-together strength of the laminated stack.

9 Claims, 1 Drawing Sheet

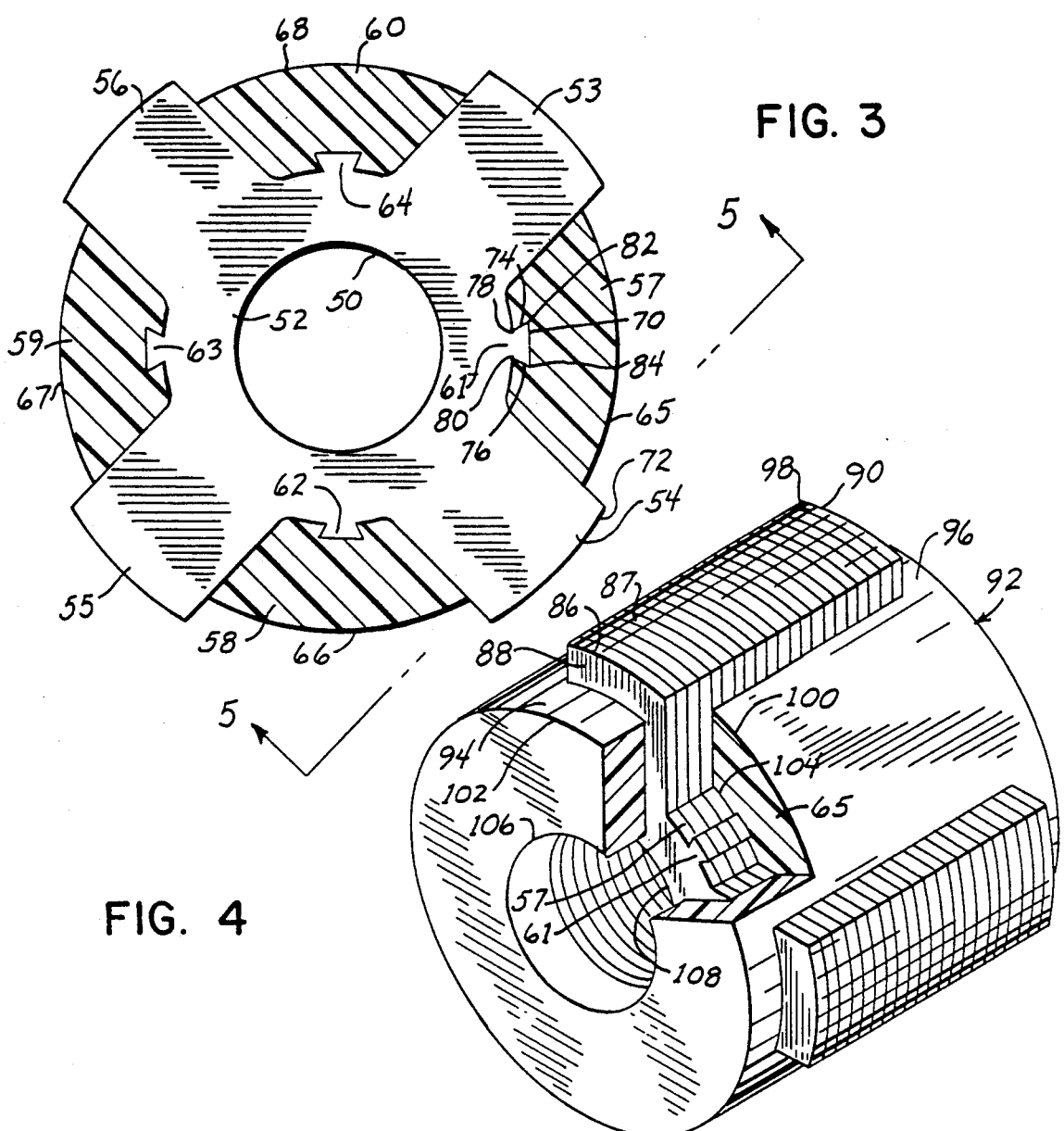
FIG. 3
FIG. 4
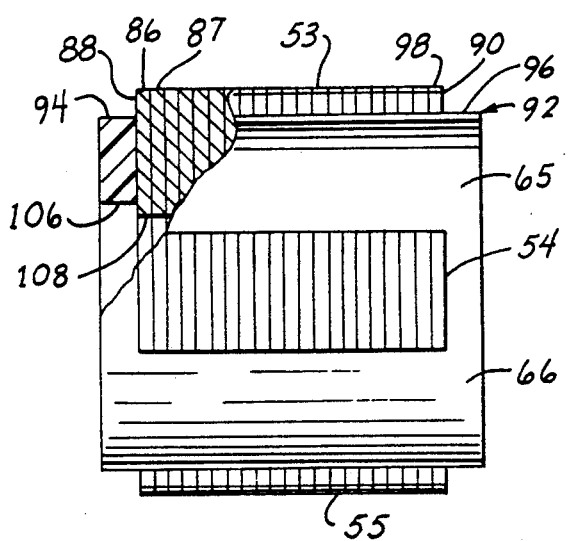
FIG. 5

SWITCHED RELUCTANCE MOTOR ROTOR

BACKGROUND AND SUMMARY

The invention relates to switched reluctance electric motor rotors, and more particularly to retention structure enhancing the hold-together strength of the rotor laminations.

In a switched reluctance motor, the rotor comprises a plurality of rotor laminations stacked axially to form a laminated stack having axial ends. The rotor includes a central annular hub having a plurality of rotor poles extending radially outwardly from the hub. The rotor poles are circumferentially spaced and have gaps therebetween. The laminations are electrically insulated from each other, to minimize interlaminar current. The laminations are typically glued together with epoxy or similar adhesive material which is cured while the laminations are held together under pressure.

The present invention provides simple and effective structure enhancing the hold-together strength of the laminated rotor stack.

BRIEF DESCRIPTION OF THE DRAWINGS

FIG. 3 is a sectional view of a switched reluctance motor rotor in accordance with the invention.

FIG. 4 is a perspective view of the rotor of FIG. 3.

FIG. 5 is a side elevation view, partially cut away, taken along line 5—5 of FIG. 3.

DETAILED DESCRIPTION

PRIOR ART

Figure 1:
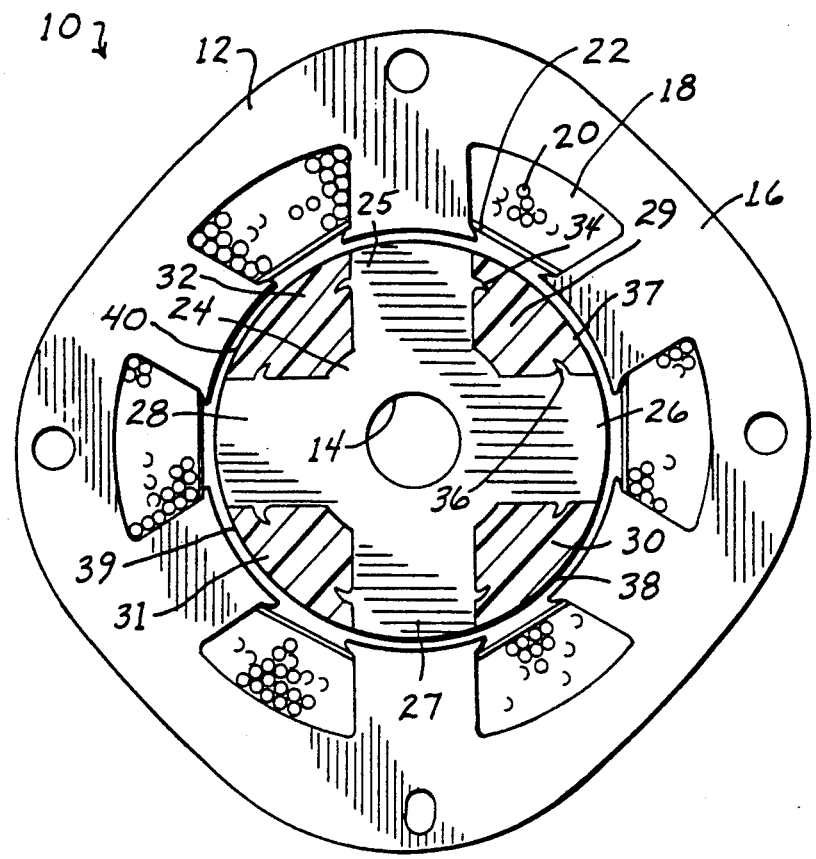
FIG. 1 is a sectional view of a switched reluctance motor known in the prior art.
Figure 2:
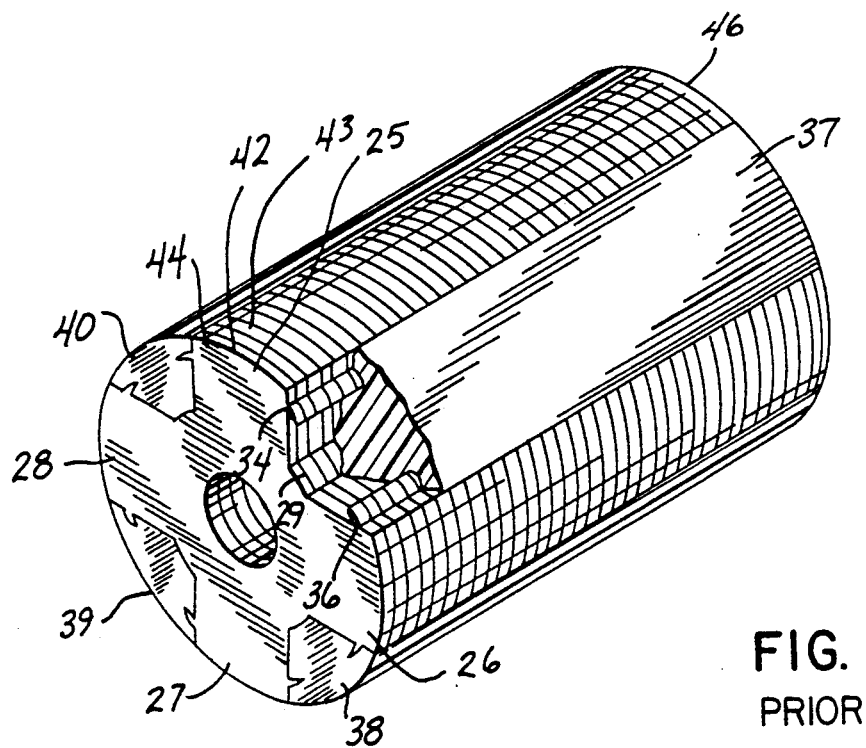
FIG. 2 is a perspective view of the motor rotor of FIG. 1.

FIG. 1 shows a switched reluctance motor 10 including stator 12 and rotor 14. The stator and rotor each comprise a plurality of laminations, and FIG. 1 shows a single lamination of each. The stator has a plurality of circumferentially spaced stator poles such as 16 with slots such as 18 therebetween. The slots receive windings 20 around the stator poles. The windings are retained in the slots by wedges such as 22. The rotor comprises a central annular hub 24 having a plurality of rotor poles 25, 26, 27, 28 extending radially outwardly from the hub. The rotor poles are circumferentially spaced and have gaps 29, 30, 31, 32 therebetween. The sides of the rotor poles have fingers such as 34 and 36 extending into the respective gap. The gaps are filled with electrically insulating material 37, 38, 39, 40. The fingers such as 34 and 36 help retain the insulating material in the respective gap. FIG. 2 shows a plurality of rotor laminations 42, 43, etc. stacked axially to form the laminated stack having axial ends 44 and 46. Insulating material 37-40 enhances the hold-together strength of the stack.

PRESENT INVENTION

FIG. 3 shows a switched reluctance motor rotor 50 in accordance with the invention. The rotor comprises a central annular hub 52 having a plurality of rotor poles 53, 54, 55, 56 extending radially outwardly therefrom. The rotor poles are circumferentially spaced and have gaps 57, 58, 59, 60 therebetween. Retention structure is provided on hub 52 in the gaps in the form of tangs 61, 62, 63, 64 extending radially outwardly from hub 52 into gaps 57, 58, 59, 60, respectively. Electrically insulating material 65, 66, 67, 68, such as bakelite, nylon, or valox, is provided in gaps 57, 58, 59, 60, respectively, and retained therein by tangs 61, 62, 63, 64, respectively.

Each of tangs 61-64 has a radial length substantially less than the radial length of rotor poles 53-56 such that the outer tip such as 70 of the tang is spaced substantially radially inwardly of the arc of travel of the outer tip such as 72 of the rotor pole. This is desirable because it minimizes magnetic flux path lines through the tang, in contrast to fingers 34, and 36 of FIGS. 1 and 2.

Tang 61 has distally opposite sides 74 and 76 with inner root ends 78 and 80 at hub 52 and outer ends 82 and 84 spaced radially outwardly of hub 52. The circumferential spacing between inner root ends 78 and 80 is less than the circumferential spacing between outer ends 82 and 84. Distally opposite sides 74 and 76 diverge away from each other as they extend away from hub 52. The remaining tangs are comparable.

FIG. 4 shows a plurality of rotor laminations 86, 87, etc. stacked axially to form a laminated stack having axial ends 88 and 90. Electric insulation material 65-68 is part of a one-piece unitary harness 92 molded in-situ axially around the laminated stack and structurally enhancing the hold-together strength thereof. Harness 92 has a plurality of axial runners provided by the noted insulation material 65, 66, 67, 68 extending axially along gaps 57, 58, 59, 60, respectively, and integral with a pair of annular end rings 94 and 96 on axial ends 88 and 90. Insulating material 65-68 extend axially beyond the end rotor laminations 86 and 98 of the laminated stack and merge into annular end rings 94 and 96. Axial runners 65-68 have a given radial extension in respective gaps 57-60, and annular end rings 94 and 96 have a given radial extension at least partially overlapping the radial extension of axial runners provided by insulating material 65-68. The outer radius 100 of axial runners provided by insulating material 65-68 is the same as the outer radius 102 of annular end rings 94 and 96. The inner radius 104 of axial runners provided by insulating material 65-68 is greater than the inner radius 106 of annular end rings 94 and 96. The inner radius 106 of annular end rings 94 and 96 is greater than the inner radius 108 of rotor 50.

The electrically molded insulating material 65-68 integrally formed both in gaps 57-60 and on axial ends 88 and 90 provides in combination axial runners provided by insulating material 65-68 extending axially along gaps 57-60 and integral with annular end rings 94 and 96 of molded material on axial ends 88 and 90, which combination further structurally enhances the hold-together strength of the laminated stack.

It is recognized that various equivalents, alternatives and modifications are possible within the scope of the appended claims. For example, although the drawings show four poles, the invention is not limited to that number but rather can be used with two, four, six or eight, or any number of rotor poles. Furthermore, although FIGS. 3 and 4 show only one tang between poles, the invention is not limited thereto, but can use one or more tangs.

I claim:

1. A switched reluctance motor rotor comprising a central annular hub having a plurality of rotor poles extending radially outwardly from said hub, said rotor poles being circumferentially spaced and having gaps therebetween, retention structure on said hub in said gaps, and electrically insulating material in said gaps and retained therein by said retention structure, wherein said rotor comprises a plurality of rotor laminations stacked axially to form a laminated stack, and wherein said retention structure comprises a tang integrally formed with each of said rotor laminations and extending from said hub into a respective one of said gaps.

2. The invention according to claim 1 wherein said tang has an outer tip and extends radially outwardly from said hub and has a radial length substantially less than the radial length of a respective one of said rotor poles such that the outer tip of said tang is spaced substantially radially inwardly of the arc of travel of the outer tip of said rotor pole, to minimize flux path lines through said tang.

3. A switched reluctance motor rotor comprising a central annular hub having a plurality of rotor poles extending radially outwardly from said hub, said rotor poles being circumferentially spaced and having gaps therebetween, retention structure on said hub in said gaps, and electrically insulating material in said gaps and retained therein by said retention structure, wherein said retention structure comprises a tang extending from said hub into a respective one of said gaps, and wherein said tang has distally opposite sides with inner root ends at said hub and outer ends spaced radially outwardly of said hub, and wherein the circumferential spacing between said inner root ends is less than the circumferential spacing between said outer ends.

4. The invention according to claim 3 wherein said distally opposite sides of said tang diverge away from each other as they extend away from said hub.

5. A switched reluctance motor rotor comprising a plurality of rotor laminations stacked axially to form a laminated stack having axial ends and comprising a central annular hub having a plurality of rotor poles extending radially outwardly from said hub, said rotor poles being circumferentially spaced and having gaps therebetween, a one-piece unitary harness molded in-situ axially around said laminated stack, wherein said harness is molded of electrically insulating material and has a plurality of axial runners extending axially along said gaps and integral with a pair of annular end rings on said axial ends, wherein said axial runners extend axially beyond the rotor laminations of said laminated stack and merge into said annular end rings, wherein said axial runners have a given radial extension, and wherein said annular end rings have a given radial extension at least partially overlapping said radial extension of said axial runners, wherein said axial runners have an outer radius, and said annular end rings have an outer radius, and wherein the outer radius of said axial runners is the same as the outer radius of said annular end rings and a retention tang integral with each of the rotor laminations and extending from said hub into a respective one of said gaps.

6. A switched reluctance motor rotor comprising a plurality of rotor laminations stacked axially to form a laminated stack having axial ends and comprising a central annular hub having a plurality of rotor poles extending radially outwardly from said hub, said rotor poles being circumferentially spaced and having gaps therebetween, a one-piece unitary harness molded in-situ axially around said laminated stack, wherein said harness is molded of electrically insulating material and has a plurality of axial runners extending axially along said gaps and integral with a pair of annular end rings on said axial ends, wherein said axial runners extend axially beyond the rotor laminations of said laminated stack and merge into said annular end rings, wherein said axial runners have a given radial extension, and wherein said annular end rings have a given radial extension at least partially overlapping said radial extension of said axial runners, wherein said annular end rings have an inner radius, and said rotor has an inner radius, and wherein the inner radius of said annular end rings is greater than the inner radius of said rotor and a retention tang and a retention tang integral with each of the rotor laminations and extending from said hub into a respective one of said gaps.

7. A switched reluctance motor rotor comprising a plurality of rotor laminations stacked axially to form a laminated stack having axial ends and comprising a central annular hub having a plurality of rotor poles extending radially outwardly from said hub, said rotor poles being circumferentially spaced and having gaps therebetween, electrically insulating molded material integrally formed both in said gaps and on said axial ends to provide in combination axial runners of said molded material extending axially along said gaps and integral with annular end rings of said molded material on said axial ends, and comprising retention structure on said hub in said gaps, and wherein said molded material in said gaps is further retained therein by said retention structure, wherein said retention structure comprises a tang integrally formed with each of said rotor laminations and extending outwardly from said hub into a respective one of said gaps.

8. The invention according to claim 7 wherein said tang has an outer tip and extends radially outwardly from said hub and has a radial length substantially less than the radial length of said rotor pole such that the outer tip of said tang is spaced substantially radially inwardly of the arc of travel of the outer tip of said rotor pole, to minimize flux path lines through said tang.

9. The invention according to claim 7 wherein said tang has distally opposite sides with inner root ends at said hub and outer ends spaced radially outwardly of said hub, and wherein the circumferential spacing between said inner root ends is less then the circumferential spacing between said outer ends.

* * * * *